(12) United States Patent
Lee (10) Patent No.: US 6,360,980 B1
(45) Date of Patent: Mar. 26, 2002

(54) SEAT BELT RETRACTOR WITH TORSION BAR

(75) Inventor: John A. Lee, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/514,022

(22) Filed: Feb. 25, 2000

(51) Int. Cl.⁷ .............................................. B65H 75/48
(52) U.S. Cl. ..................... 242/379.1; 297/472; 280/805
(58) Field of Search ................... 242/379.1; 280/805, 280/806; 297/470, 471, 472; 21/115

(56) References Cited

U.S. PATENT DOCUMENTS

| | | |
|---|---|---|
| 5,526,996 A | 6/1996 | Enber et al. |
| 5,547,143 A | 8/1996 | Miller, III et al. |
| 5,628,469 A * | 5/1997 | Fohl ........................ 242/379.1 |
| 5,636,806 A | 6/1997 | Sayles |
| 5,687,925 A | 11/1997 | Sayles |
| 5,772,144 A * | 6/1998 | Tanabe et al. ............ 242/379.1 |
| 5,794,877 A * | 8/1998 | Ono et al. ................ 242/379.1 |
| 5,820,058 A * | 10/1998 | Hirzel et al. ............. 242/379.1 |
| 5,823,570 A | 10/1998 | Lane, Jr. et al. |
| 5,938,135 A | 8/1999 | Sasaki et al. |
| 5,954,287 A * | 9/1999 | Hirase ...................... 242/379.1 |
| 5,961,060 A * | 10/1999 | Brambilla et al. ....... 242/379.1 |
| 5,984,223 A * | 11/1999 | Hiramatsu ................ 242/379.1 |
| 6,029,924 A * | 2/2000 | Ono et al. ................ 242/379.1 |
| 6,131,843 A * | 10/2000 | Singer et al. ............ 242/379.1 |
| 6,216,972 B1 * | 4/2001 | Rohrle ..................... 242/379.1 |

* cited by examiner

Primary Examiner—Donald P. Walsh
Assistant Examiner—Daniel K Schlak
(74) Attorney, Agent, or Firm—Tarolli, Sundheim, Covell, Tummino & Szabo L.L.P.

(57) ABSTRACT

A seat belt retractor (10) includes a spool member (40) on which seat belt webbing (16) is wound. The spool member (40) is supported for rotation in a belt withdrawal direction (52) and an opposite belt retraction direction (54). The retractor (10) includes a plastically deformable torsion bar member (70) having a first portion (78) and a second portion (74). The second portion (78) of the torsion bar member (70) is rotatable relative to the first portion (74). The torsion bar member (70) twists upon rotation of the second portion (78) relative to the first portion (74). When the torsion bar member (70) twists, the spool member (40) rotates in the belt withdrawal direction (52) relative to the ratchet member (60), and the spool member cutter portion (92, 94) of the ratchet member cuts into the spool member (82, 84) to increase the resistance to rotation of the spool member relative to the ratchet member.

16 Claims, 4 Drawing Sheets

Fig.8

SEAT BELT RETRACTOR WITH TORSION BAR

BACKGROUND OF THE INVENTION

1. Technical Field

The present invention relates to a seat belt retractor, and particularly relates to a seat belt retractor including a torsion bar for absorbing energy of a vehicle occupant.

2. Description of the Prior Art

A known vehicle seat belt retractor includes seat belt webbing wound on a spool of the retractor. A spool locking mechanism for the retractor includes a ratchet rotatable with the spool and a pawl. The pawl is movable into engagement with the ratchet to block rotation of the ratchet. This actuation of the spool locking mechanism blocks withdrawal of seat belt webbing from the spool, to help protect a vehicle occupant in the event of a vehicle collision.

The retractor includes a torsion bar acting between the spool and the ratchet. When the spool locking mechanism is actuated, and the occupant moves forward against the seat belt webbing with sufficient force, the kinetic energy of the occupant is transmitted through the spool into the torsion bar and the ratchet. The torsion bar begins to twist when a given load is applied to the belt webbing. The twisting of the torsion bar allows the spool to rotate relative to the ratchet and allows a small amount of belt webbing to pay out. This release of belt webbing permits a small amount of additional forward movement of the vehicle occupant and reduces the peak load on the occupant.

SUMMARY OF THE INVENTION

The present invention is a seat belt retractor comprising a spool member on which seat belt webbing is wound. The spool member is supported for rotation in a belt retraction direction and an opposite belt withdrawal direction. The retractor includes a plastically deformable torsion bar member having a first portion and a second portion. The second portion of the torsion bar member is rotatable relative to the first portion. The torsion bar member twists upon rotation of the second portion relative to the first portion.

The retractor includes an actuatable spool locking mechanism for, when actuated, blocking rotation of the spool member in the belt withdrawal direction. The spool locking mechanism includes a ratchet member and a pawl movable into locking engagement with the ratchet member to block rotation of the ratchet member. One of the spool member and the torsion bar member and the ratchet member has a spool cutter portion. The spool member is fixed for rotation with the first portion of the torsion bar member and the ratchet member is fixed for rotation with the second portion of the torsion bar member. The torsion bar member thereby resists rotation of the spool member relative to the ratchet member. The torsion bar member twists when the spool locking mechanism is actuated and tensile force from the seat belt webbing is applied to the spool member in an amount exceeding a predetermined amount. As the torsion bar member twists, the spool member rotates in the belt withdrawal direction relative to the ratchet member, and the cutter portion of the one member cuts into another one of the members to increase the resistance to rotation of the spool member relative to the ratchet member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EMBODIMENTS OF THE INVENTION

Figure 1:
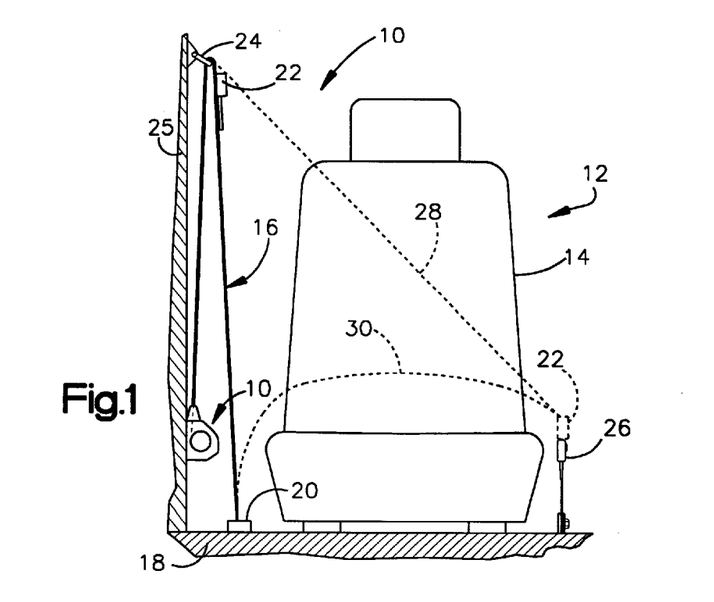
FIG. 1 is a schematic illustration of a vehicle seat belt system including a retractor constructed in accordance with the present invention.

The present invention relates to a seat belt retractor including a torsion bar for absorbing energy of a vehicle occupant. The present invention is applicable to various seat belt retractors. As representative of the invention, FIG. 1 illustrates a retractor 10, which forms part of a three-point continuous loop seat belt system 12 for use in helping to protect an occupant of a vehicle 13.

The occupant of the vehicle 13 sits on a vehicle seat 14, which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10, which is secured to the vehicle B-pillar 25 on the same side of the seat 14. Intermediate its ends, the belt webbing 16 passes through a tongue assembly 22 and a D-ring or turning loop 24 that is mounted to the B-pillar 25 above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28, which extends across the torso of the occupant, and a lap portion 30, which extends across the lap of the occupant.

Figure 2:
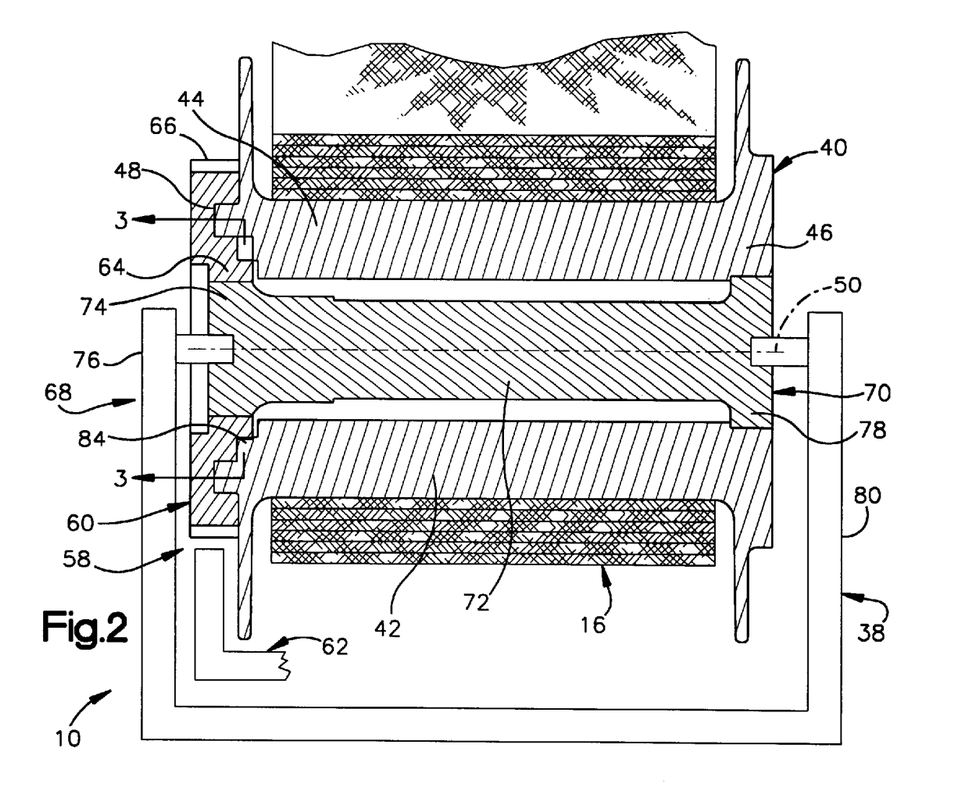
FIG. 2 is a longitudinal sectional view of the retractor of FIG. 1.

The seat belt retractor 10 has a base indicated schematically at 38 (FIG. 2), which is secured to the B-pillar 25 in a manner not shown in FIG. 2. The retractor 10 includes a seat belt webbing spool 40 supported for rotation relative to the base 38. The spool 40 is preferably made from metal, such as cast aluminum. The spool could, alternatively, be made from a plastic material.

The spool 40 has a main body portion 42 and opposite first and second end portions 44 and 46. The seat belt webbing 16 is wound on the main body portion of the spool 40. An annular hub 48 projects axially from the first end portion 44 of the spool 40.

The spool 40 is rotatable relative to the base about an axis 50 in a belt webbing withdrawal direction 52 (FIGS. 3–5) and an opposite belt webbing retraction direction 54. The retractor 10 includes a rewind spring (not shown), which acts between the base 38 and the spool 40 to bias the spool to rotate in the belt webbing retraction direction 54.

The retractor 10 includes a spool locking mechanism 58. The spool locking mechanism 58 includes a ratchet 60 and a pawl shown partially at 62. The ratchet 60 is preferably made from a metal such as steel and is supported on the hub 48 of the spool 40 for rotation relative to the spool. The ratchet 60 has a hub portion 64 and a toothed outer peripheral portion 66. The outer peripheral portion 66 of the ratchet 60 is engageable by the pawl 62 to block rotation of the ratchet about the axis 50 in the belt withdrawal direction 52. This engagement, in a manner described below, also blocks rotation of the spool 40 in the belt withdrawal direction 52.

The retractor 10 includes an energy management device 68. The energy management device 68 includes the ratchet 60 as well as a torsion bar 70. The torsion bar 70 is made from a ductile metal that enables the torsion bar to be twisted about the axis 50 up to five or six times without breaking. The torsion bar 70 has an elongate cylindrical main body portion 72 centered on the axis 50.

A first end portion 74 of the torsion bar 70 is secured by a splined connection in the hub portion 64 of the ratchet 60. The first end portion 74 of the torsion bar 70 is thereby fixed for rotation with the ratchet 60, about the axis 50, relative to the base 38. A portion 76 of the base 38 supports the first end portion 74 of the torsion bar 70, and thereby the ratchet 60 and the first end portion 44 of the spool 40, for rotation about the axis 50 relative to the base 38. An opposite second end portion 78 of the torsion bar 70 is fixed to the second end portion 46 of the spool 40. A portion 80 of the base 38 supports the second end portion 78 of the torsion bar 60, and thereby the second end portion 46 of the spool 40, for rotation about the axis 50 relative to the base 38.

The torsion bar 70 connects the spool 40 and the ratchet 60 in a force-transmitting relationship, coupling them together for rotation about the axis 50. So long as the torsion bar 70 is not twisting about its axis, the spool 40 and the ratchet 60 rotate together about the axis 50 as one unit. Therefore, engagement of the pawl 62 with the ratchet 60, which blocks rotation of the ratchet about the axis 50 in the belt withdrawal direction 52, normally also blocks rotation of the spool 40 about the axis.

The energy management device 68 of the retractor 10 also includes first and second lugs 82 and 84 on the spool 40. The lugs 82 and 84 are formed on the radially inner periphery of the first end portion 44 of the spool 40. The lugs 82 and 84 are formed as one piece with the other portions of the spool 40.

Figure 3:
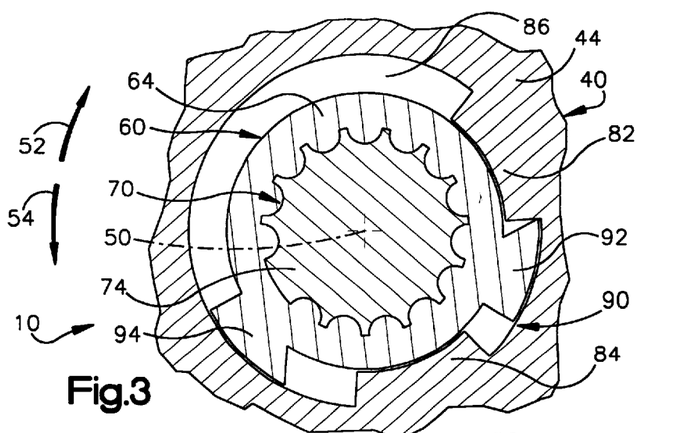
FIG. 3 is an enlarged fragmentary sectional view of the retractor of FIG. 2, taken generally along line 3—3 of FIG. 2 and showing parts of the retractor in a first condition.

The lugs 82 and 84 are small portions of the material of the spool 40 that project radially inward toward the axis 50. The lugs 82 and 84 are spaced apart from each other circumferentially about the axis 50. Specifically, the second lug 84 is spaced circumferentially from the first lug 82, in the belt withdrawal direction 52, about the axis 50. Thus, when the spool rotates about the axis 50, the lugs 82 and 84 revolve about the axis, in an annular space or path indicated at 86.

The energy management device 68 of the retractor 10 also includes a spool cutter portion 90 of the ratchet 60. The spool cutter portion 90 includes first and second cutting teeth 92 and 94. The cutting teeth 92 and 94 are small portions of the ratchet 60 that project radially outward, in a direction away from the axis 50. The cutting teeth are formed as one piece with the other portions of the ratchet 60. Thus, when the ratchet 60 rotates about the axis 50, the cutting teeth 92 and 94 revolve about the axis 50. The cutting teeth revolve in the same annular space 86 as the lugs 82 and 84 of the spool 40.

The first and second cutting teeth 92 and 94 are spaced apart from each other circumferentially about the axis 50. The first cutting tooth 92 is located circumferentially between the first lug 82 and the second lug 84 of the spool 40 and engages the first lug. The second cutting tooth 94 is spaced apart circumferentially from the second lug 84, in the belt withdrawal direction 52.

In normal operation of the retractor 10, the spool 40 rotates relative to the base 38 under the influence of forces applied from the belt webbing 16 and the retractor's rewind spring. The torsion bar 70 transmits the rotational force of the spool 40 to the ratchet 60, and the ratchet thus rotates with the spool.

In certain circumstances, such as rapid vehicle deceleration leading to rapid forward movement of the vehicle occupant against the torso portion 28 of the belt webbing 16, the pawl 62 is moved, in a known manner, into engagement with the ratchet 60. The engagement of the pawl 62 with the ratchet 60 blocks rotation of the ratchet in the belt withdrawal direction 52.

When the ratchet 60 is blocked from rotation in the belt withdrawal direction 52, the inherent resistance to deformation of the torsion bar 70 resists rotation of the spool 40 relative to the ratchet 60. The engagement of the first cutting tooth 92 on the ratchet 60 with the first lug 82 on the spool 40 also resists rotation of the spool relative to the ratchet. The spool 40 is thus blocked from rotation in the belt withdrawal direction 52.

The resistance to spool rotation that is provided by the engagement of the cutting tooth 92 with the lug 82 is greater than the resistance to spool rotation that is provided by the torsion bar 70. That is, application of a force sufficient to cause twisting of the torsion bar 70 alone, but not to cause cutting of the first spool lug 82, does not result in rotation of the spool 40 relative to the ratchet 60 in the belt withdrawal direction 52. For example, in one embodiment, the torsion bar can twist under an applied load of 600 pounds to the belt webbing, while a force of about 1,000 pounds must be applied to the belt webbing to overcome the resistance to rotation provided by the engagement of the cutting tooth 92 with the lug 82. Thus, the provision of the cutting teeth 92 and 94 and the lugs 82 and 84 increases the load required to turn the spool, reducing belt pay-out at low loads, as compared to a retractor including only the torsion bar 70.

FIG. 3 illustrates the retractor 10 in a condition in which the spool locking mechanism 58 is actuated and the torsion bar 70 is in an untwisted condition. The first cutting tooth 92 on the ratchet 60 is in engagement with the first lug 82 on the spool 40. The second cutting tooth 94 on the ratchet 60 is spaced apart circumferentially from the second lug 84 on the spool 40.

The spool 40 can rotate relative to the ratchet 60, to commence belt pay-out when the spool locking mechanism is actuated, only when a tensile force greater than that needed to overcome the stronger of these two resistive forces is applied to the belt webbing 16 and thus to the spool. This predetermined amount of tensile force is selected to be a force that is not experienced during use of the seat belt system 12 other than in a vehicle collision.

When tensile force in an amount exceeding the predetermined force is applied through the belt webbing 16 to the spool 40, the force is transmitted through the second end portion 46 of the spool into the second end portion 78 of the torsion bar 70. Because the first end portion 74 of the torsion bar 70 is blocked from rotation by the ratchet 60, the torsion bar attempts to deform plastically by twisting the second end portion 78 relative to the first end portion. At the same time, the force from the belt webbing 16 is transmitted through the first end portion 44 of the spool 40 into the first lug 82. This force is applied by the first lug 82 against the first cutting tooth 92 on the ratchet 60.

Figure 4:
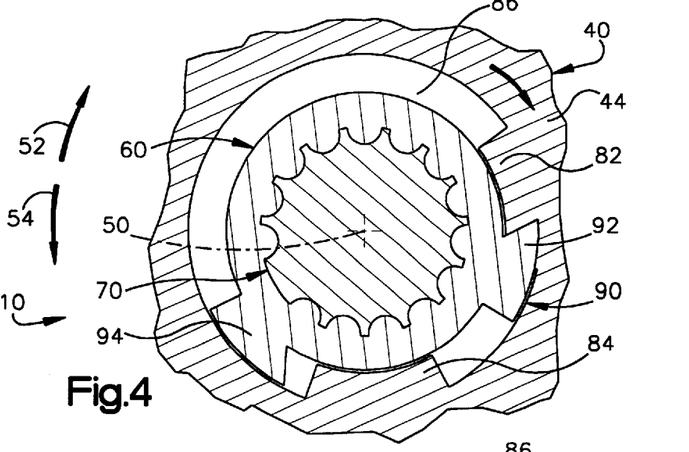
FIG. 4 is a view similar to FIG. 3 showing parts of the retractor in a second condition.

The first cutting tooth 92 on the ratchet 60 begins to cut into the first lug 82 on the spool 40. The spool 40 begins to rotate relative to the ratchet 60 in the belt withdrawal direction 52, and the torsion bar 70 begins to twist. The parts of the energy management device 68 move to and through a first actuated condition shown in FIG. 4. As illustrated in FIG. 4, the first cutting tooth 92 on the ratchet 60 has cut partially through the first lug 82 on the spool 40. The second lug 84 on the spool 40 has moved circumferentially closer to the second cutting tooth 94 on the ratchet 60, but is still spaced apart from the second cutting tooth. The torsion bar 70 has begun to twist.

The resulting relative rotation of the spool 40 and the ratchet 60 causes a small amount of belt webbing 16 to be unwound from the spool. The occupant's forward movement against the belt webbing 16 is restrained at a reduced rate over an increased period of time, helping to reduce maximum load experienced by the vehicle occupant.

Figure 5:
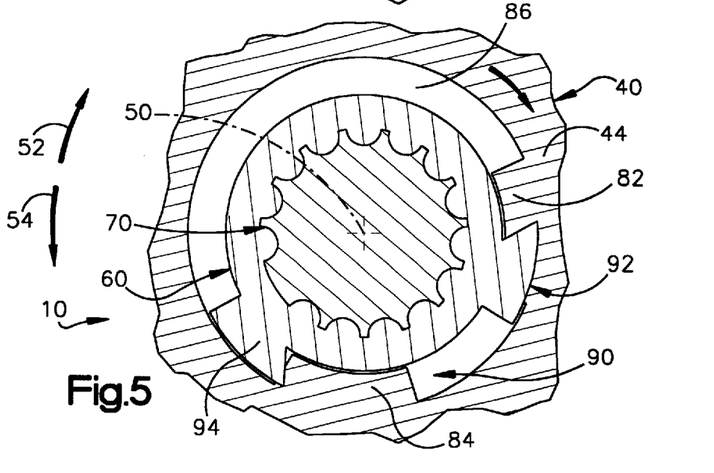
FIG. 5 is a view similar to FIG. 3 showing parts of the retractor in a third condition.

As the spool 40 rotates farther relative to the ratchet 60, an increased amount of the first lug 82 on the spool 40 is cut off by the first cutting tooth 92 on the ratchet 60. Before the first lug 82 is completely cut off, the second lug 84 on the spool 40 moves into engagement with the second cutting tooth 94 on the ratchet 60 as shown in FIG. 5. The second cutting tooth 94 begins to cut into the second lug 84, thus maintaining or increasing the resistance to rotation of the spool 40 relative to the ratchet 60. This can prevent an abrupt decrease in the resistance to rotation of the spool 40 should an uncut portion of the first lug 82 break off at some point rather than be cut off.

If the load on the belt webbing 16 is sufficient in magnitude and duration, the spool 40 rotates far enough relative to the ratchet 60 that both the first and second lugs 82 and 84 are cut off by the spool cutter portion 90 of the ratchet 60. After the second lug 84 is cut off, only the twisting of the torsion bar 70 resists relative rotation of the spool 40 and the ratchet 60. Each successive increment of rotation of the spool 40 causes the torsion bar 70 to twist in a greater amount. As a result, the resistance that the torsion bar 70 applies to rotation of the spool 40 constantly increases.

Varying the relative positions and circumferential lengths of the spool lugs 82 and 84 and of the ratchet cutting teeth 92 and 94 can provide different amounts of resistance to unwinding of the belt webbing 16. For example, in the illustrated embodiment, the first lug 82 has a circumferential extent of 58 degrees about the axis 50. The second cutting tooth 94 starts cutting the second lug 84 after about 24 degrees of rotation of the spool 40 relative to the ratchet 60. The second lug 84 has a circumferential extent of about 58 degrees about the axis 50. Thus, the spool 40 can rotate about 82 degrees total before both the first and second lugs 82 and 84 are sheared off. Thereafter, the twisting of the torsion bar 70 alone resists rotation of the spool 40 relative to the ratchet 60.

Figure 6:
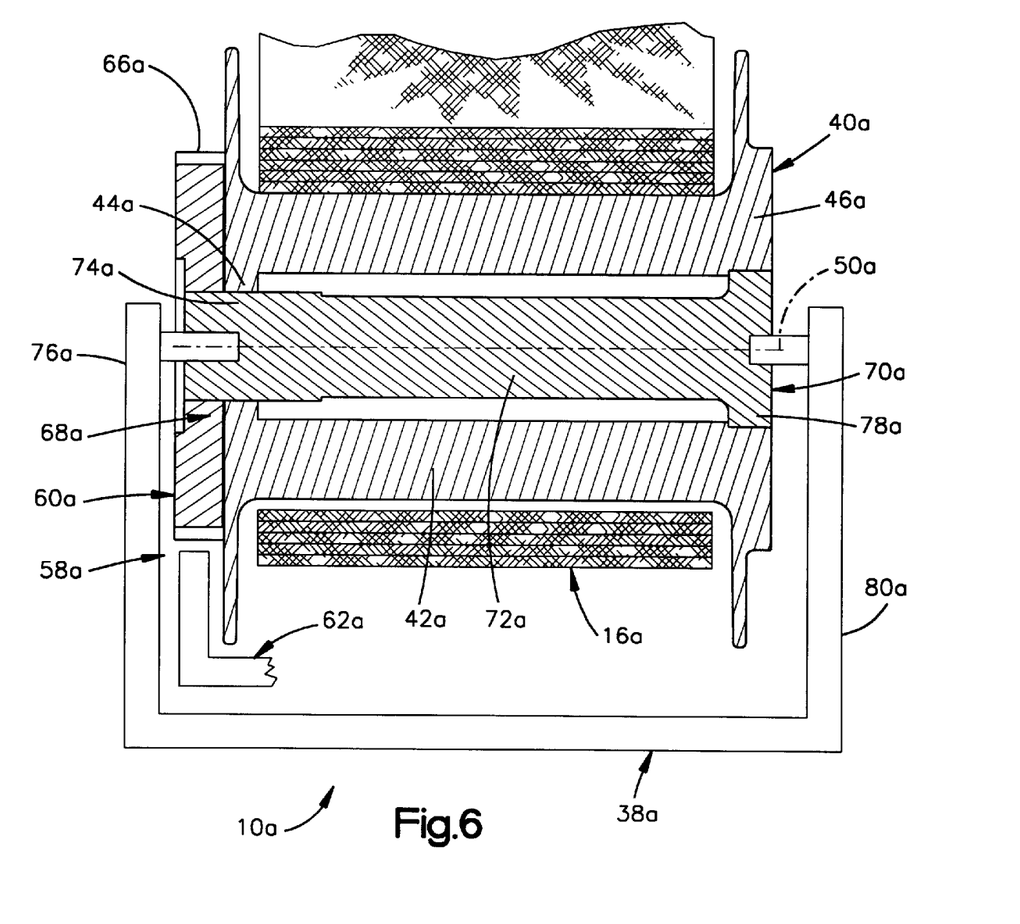
FIG. 6 is a longitudinal sectional view of a retractor in accordance with a second embodiment of the invention.
Figure 7:
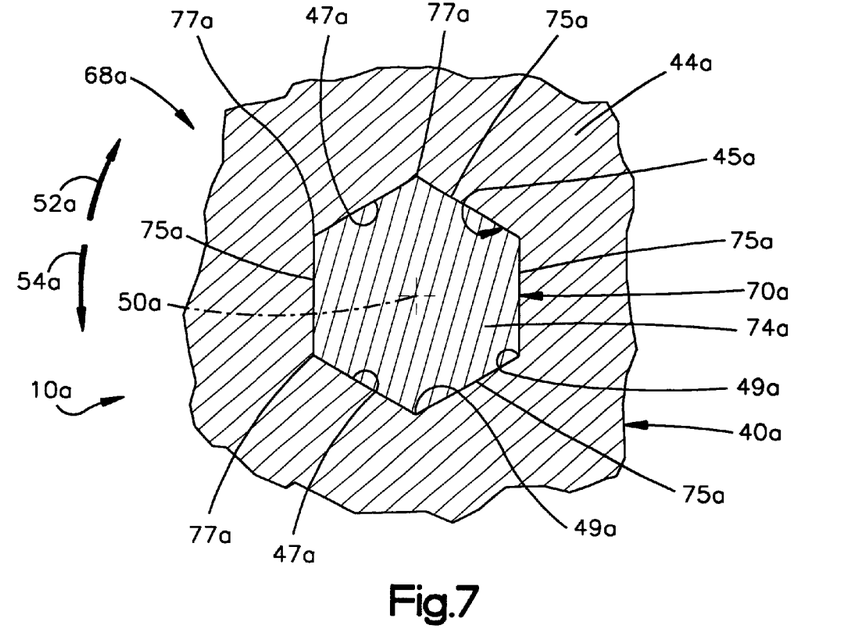
FIG. 7 is a view similar to FIG. 3 showing parts of the retractor of FIG. 6 in a first condition.
Figure 8:
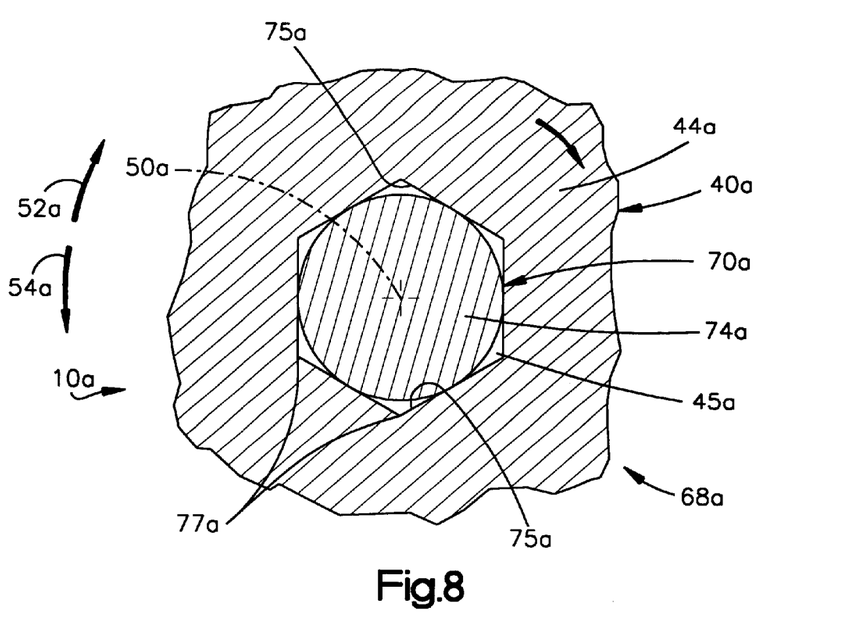
FIG. 8 is a view similar to FIG. 7 showing parts of the retractor of FIG. 6 in a second condition.

FIGS. 6–8 illustrate a seat belt retractor 10a constructed in accordance with a second embodiment of the invention. Parts of the retractor 10a that are similar to corresponding parts of the retractor 10 (FIGS. 1–5) are given the same reference numerals with the suffix "a" added.

The retractor 10a includes a base 38a. A seat belt webbing spool 40a is supported for rotation relative to the base 38a. The spool 40a has a main body portion 42a, a first end portion or cutter portion 44a, and a second end portion 46a. The seat belt webbing 16a is wound on the main body portion 42a of the spool 40a.

A torsion bar 70a supports the spool 40a on the base 38a for rotation relative to the base about an axis 50a. The material of the torsion bar 70a is softer than the material of the spool 40a. The torsion bar 70a has an elongate cylindrical main body portion 72a centered on the axis 50a.

A first end portion 74a of the torsion bar 70a has a hexagonal configuration including six outer side surfaces 75a (FIG. 7) that meet at corners 77a. The first end portion 44a of the spool 40a has an internal opening 45a with a hexagonal configuration including six inner side surfaces 47a that meet at internal corners 49a. The first end portion 74a of the torsion bar 70a is press fitted in the opening 45a in the first end portion 44a of the spool 40a. The outer side surfaces 75a of the first end portion 74a of the torsion bar 70a are in abutting engagement with the inner side surfaces 47a of the first end portion 44a of the spool 40a.

As a result of the engagement between the surfaces 47a and 75a, the first end portion 44a of the spool 40a is connected for rotation with the first end portion 74a of the torsion bar 70a. A portion 76a of the base 38a supports the first end portion 74a of the torsion bar 70a, and thereby the first end portion 44a of the spool 40a, for rotation about the axis 50a relative to the base.

An opposite second end portion 78a of the torsion bar 70a is secured by a splined connection to the second end portion 46a of the spool 40a. The second end portion 78a of the torsion bar 70a is thereby fixed for rotation with the spool 40a. A portion 80a of the base 38a supports the second end portion 78a of the torsion bar 70a, and thereby the second portion 46a of the spool 40a, for rotation about the axis 50a relative to the base.

The spool 40a is rotatable about the axis 50a in a belt withdrawal direction 52a (FIGS. 7 and 8) and an opposite belt retraction direction 54a. The retractor 10a includes a rewind spring mechanism (not shown), which acts between the base 38a and the spool 40a to bias the spool to rotate in the belt webbing retraction direction 54a.

The retractor 10a includes a spool locking mechanism 58a. The spool locking mechanism 58a includes a ratchet 60a and a pawl shown partially at 62a. The ratchet 60a is fixed on the first end portion 74a of the torsion bar 70a for rotation relative to the base 38a with the torsion bar. The ratchet 60a has a toothed outer peripheral portion 66a engageable by the pawl 62a to block rotation of the ratchet about the axis 50a in the belt withdrawal direction 52a. This engagement, in a manner described below, also blocks rotation of the spool 40a in the belt withdrawal direction 52a.

The torsion bar 70a connects the spool 40a and the ratchet 60a in a force-transmitting relationship, coupling them together for rotation about the axis 50a. So long as the torsion bar 70a is not twisting about its axis, the torsion bar, the spool 40a, and the ratchet 60a rotate together about the axis 50a as one unit. Therefore, engagement of the pawl 62a with the ratchet 60a, which blocks rotation of the ratchet about the axis 50a in the belt withdrawal direction 52a, normally also blocks rotation of the spool 40a and the torsion bar about the axis.

When the ratchet 60a is blocked from rotation in the belt withdrawal direction 52a, the press fit connection of the ratchet on the first end portion 74a of the torsion bar 70a resists rotation of the first end portion of the torsion bar about the axis 50a. The inherent resistance to deformation of the entire torsion bar 70a resists rotation of the second end portion 78a of the torsion bar about the axis 50a. The splined connection of the second end portion 46a of the spool 40a on the second end portion 78a of the torsion bar 70a resists rotation of the spool about the axis 50a. In addition, the hex connection of the first end portion 44a of the spool 40a on the first end portion 74a of the torsion bar 70a resists rotation of the spool about the axis 50a. The spool 40a is thus blocked from rotation in the belt withdrawal direction 52a.

The resistance to spool rotation that is provided by the hex connection between the first end portion 44a of the spool 40a and the first end portion 74a of the torsion bar 70a is greater than the resistance to spool rotation that is provided by the torsion bar itself. That is, application of a force sufficient to cause twisting of the torsion bar 70a alone does not result in rotation of the spool 40a relative to the ratchet 60a in the belt withdrawal direction 52a. Such relative rotation of the spool 40a will not occur unless there is stripping of the hex connection between the first end portion 44a of the spool 40a and the first end portion 74a of the torsion bar. Thus, the provision of the hex connection between the torsion bar 70a and the spool 40a increases the load required to turn the spool relative to the ratchet 60a, reducing belt pay-out at low loads, as compared to a retractor in which the first end portion of the spool is a slip fit on the first end portion of the torsion bar.

FIG. 7 illustrates a portion of the retractor 10a in a condition in which the spool locking mechanism 58a is actuated and the torsion bar 70a is in an untwisted condition. The hexagonal first end portion 74a of the torsion bar 70a is in an undeformed or unstripped condition in the hexagonal opening 45a in the first end portion 44a of the spool 40a.

The spool 40a can rotate relative to the ratchet 60a, to commence belt pay-out when the spool locking mechanism 58a is actuated, only when a force greater than a predetermined tensile force is applied to the belt webbing 16 and thus to the spool. The predetermined tensile force is at least equal to the force needed to overcome the resistive force of the hexagonal spool-torsion bar connection. This predetermined amount of tensile force is also selected to be a force that is not experienced during use of the retractor 1a other than in a vehicle collision.

When tensile force in an amount exceeding the predetermined force is applied through the belt webbing 16a (FIG. 6) to the spool 40a, the force is transmitted through the second end portion 46a of the spool into the second end portion 78a of the torsion bar 70a. Because the first end portion 74a of the torsion bar 70a is blocked from rotation by the ratchet 60a, the torsion bar attempts to deform plastically by twisting the second end portion 78a relative to the first end portion. At the same time, the force from the belt webbing 16a is transmitted through the first end portion 44a of the spool 40a into the first end portion 74a of the torsion bar 70a.

The first end portion 44a (FIGS. 7 and 8) of the spool 40a begins to rotate relative to the first end portion 74a of the torsion bar 70a, stripping the connection between the two parts and cutting a groove into the softer material of the first end portion of the torsion bar. The corners 77a of the hexagonal first end portion 74a of the torsion bar 70a are cut off by the first end portion 44a of the spool 40a. The spool 40a begins to rotate relative to the ratchet 60a in the belt withdrawal direction 52a, and the torsion bar 70a begins to twist. The parts of the energy management device 68a move from the unactuated condition shown in FIG. 7 to an actuated condition shown in FIG. 8.

The resulting relative rotation of the spool 40a and the ratchet 60a causes a small amount of belt webbing 16a to be unwound from the spool. The occupant's forward movement against the belt webbing 16a is restrained at a reduced rate over an increased period of time, helping to reduce the maximum load experienced by the vehicle occupant.

As the spool 40a rotates relative to the ratchet 60a and the parts of the retractor 10a move to the actuated condition shown in FIG. 8, the groove being cut in the first end portion 74a of the torsion bar 70a by the first end portion 44a of the spool 40a becomes deeper. If the load on the belt webbing 16a is sufficient in magnitude and duration, the spool 40a rotates far enough relative to the ratchet 60a that the first end portion 74a of the torsion bar 70a assumes a cylindrical configuration. The cylindrical configuration has a diameter equal to the diameter of a cylinder located within the hexagonal opening 45a of the first end portion 44a of the spool 40a. After this stripping of the hex connection between the first end portion 44a of the spool 40a and the first end portion 74a of the torsion bar 70a occurs, only the twisting of the torsion bar resists relative rotation of the spool 40a and the ratchet 60a. Each successive increment of rotation of the spool 40a causes the torsion bar 70a to twist in a greater amount. As a result, the resistance that the torsion bar 70a applies to rotation of the spool 40a constantly increases.

The resistance to stripping of the hex connection between the spool 40a and the torsion bar 70a is a function of the axial length of the connection. If the cutter portion 44a of the spool 40a is made narrower (axially shorter), its connection with the torsion bar 70a can strip more easily, that is, at a lower force level. If the cutter portion 44a of the spool 40a is made wider (axially longer), its connection with the torsion bar 70a will strip at a higher force level. In this manner, the amount of force required before commencement of belt webbing payout can be tailored.

From the above description of the invention, those skilled in the art will perceive improvements, changes and modifications in the invention. Such improvements, changes and modifications within the skill of the art are intended to be covered by the appended claims.

Having described the invention, I claim:

1. A seat belt webbing retractor comprising:

a spool member on which seat belt webbing is wound, said spool member being supported for rotation in a belt retraction direction and an opposite belt withdrawal direction;

a plastically deformable torsion bar member having a first portion and a second portion, said second portion of said torsion bar member being rotatable relative to said first portion, said torsion bar member twisting upon rotation of said second portion relative to said first portion;

an actuatable spool locking mechanism for when actuated blocking rotation of said spool member in the belt withdrawal direction, said spool locking mechanism including a ratchet member and a pawl movable into locking engagement with said ratchet member to block rotation of said ratchet;

one of said spool member and said torsion bar member and said ratchet member having a cutter portion;

said spool member being fixed for rotation with said first portion of said torsion bar member and said ratchet member being fixed for rotation with said second portion of said torsion bar member, said torsion bar member thereby resisting rotation of said spool member relative to said ratchet member;

said torsion bar member twisting and said spool member rotating in the belt withdrawal direction relative to said ratchet member and said cutter portion of said one of said members cutting into another one of said members to increase the resistance to rotation of said spool member relative to said ratchet member when said spool locking mechanism is actuated and upon the application of tensile force from the seat belt webbing to said spool member in an amount exceeding a predetermined amount;

said cutter portion moving into material of said another one of said members to separate some of the material of said another one of said members from said another one of said members;

said torsion bar member twisting and said cutter portion cutting at the same time.

2. A retractor as set forth in claim 1 wherein said ratchet member has said cutter portion and said cutter portion cuts into said spool member.

3. A retractor as set forth in claim 2 wherein said another one of said members has at least one lug that is cut into gradually by said cutter portion of said ratchet member upon rotation of said spool member in the belt withdrawal direction relative to said ratchet member during twisting of said torsion bar member.

4. A retractor as set forth in claim 3 wherein said spool member has at least first and second lugs spaced apart from each other circumferentially about an axis of rotation of said spool member.

5. A retractor as set forth in claim 2 wherein said cutter portion of said ratchet member comprises at least one cutting tooth that is engageable with said spool member to cut into said spool member upon rotation of said spool member in the belt withdrawal direction relative to said ratchet member.

6. A retractor as set forth in claim 5 wherein said cutter portion of said ratchet member comprises at least first and second cutting teeth spaced apart from each other circumferentially about an axis of rotation of said spool member.

7. A retractor as set forth in claim 1 wherein said spool member has said cutter portion and said cutter portion cuts into said torsion bar member.

8. A retractor as set forth in claim 7 wherein said spool member is connected for rotation with said torsion bar member by a strippable connection that is adapted to strip when said spool locking mechanism is actuated and upon the application of tensile force from the seat belt webbing to said spool member in an amount exceeding the predetermined amount, said strippable connection resisting rotation of said spool about said axis by an amount that is greater than the resistance to spool rotation that is provided by said torsion bar member itself, whereby application of a force sufficient to cause twisting of said torsion bar member alone does not result in rotation of said spool relative to said ratchet in the belt withdrawal direction, and relative rotation of said spool does not occur unless there is stripping of said strippable connection between said spool and said torsion bar member.

9. A retractor as set forth in claim 8 wherein said torsion bar member has a non-circular external configuration, said spool member having a portion having a similar internal configuration, said torsion bar member portion being received within said spool member portion to form said strippable connection.

10. A retractor as set forth in claim 8 wherein said torsion bar member has a hexagonal external configuration received within a hexagonal internal configuration of said spool member portion to form said strippable connection.

11. A retractor as set forth in claim 1 wherein said another one of said members has at least one separable portion that is cut into gradually by said cutter portion of said one member upon rotation of said spool member in the belt withdrawal direction relative to said ratchet member during twisting of said torsion bar member, and wherein said one separable portion is separated completely from said another one of said members after a predetermined amount of rotation of said spool member in the belt withdrawal direction relative to said ratchet member during twisting of said torsion bar member.

12. A retractor as set forth in claim 1 wherein said ratchet has said cutter portion and member that is cut into comprises a projecting portion of said spool, said cutter portion and said projecting spool portion projecting radially, from opposite directions, into an annular space defined between said spool and said ratchet, said cutter portion and said projecting spool portion rotating together in said annular space.

13. A retractor as set forth in claim 1 wherein said cutter portion cuts along a cylindrical path centered on an axis of rotation of said spool member.

14. A seat belt webbing retractor comprising:

a spool member on which seat belt webbing is wound, said spool member being supported for rotation in a belt retraction direction and an opposite belt withdrawal direction;

a plastically deformable torsion bar member having a first portion and a second portion, said second portion of said torsion bar member being rotatable relative to said first portion, said torsion bar member twisting upon rotation of said second portion relative to said first portion;

an actuatable spool locking mechanism for when actuated blocking rotation of said spool member in the belt withdrawal direction, said spool locking mechanism including a ratchet member and a pawl movable into locking engagement with said ratchet member to block rotation of said ratchet;

one of said spool member and said torsion bar member and said ratchet member having a cutter portion;

said spool member being fixed for rotation with said first portion of said torsion bar member and said ratchet member being fixed for rotation with said second portion of said torsion bar member, said torsion bar member thereby resisting rotation of said spool member relative to said ratchet member;

said torsion bar member twisting and said spool member rotating in the belt withdrawal direction relative to said ratchet member and said cutter portion of said one of said members cutting into another one of said members to increase the resistance to rotation of said spool member relative to said ratchet member when said spool locking mechanism is actuated and upon the application of tensile force from the seat belt webbing to said spool member in an amount exceeding a predetermined amount;

wherein said ratchet member has said cutter portion and said cutter portion cuts into said spool member;

wherein said spool member has at least one lug that is cut into by said cutter portion of said ratchet member upon rotation of said spool member in the belt withdrawal direction relative to said ratchet member;

wherein said spool member has at least first and second lugs spaced apart from each other circumferentially about an axis of rotation of said spool member; and wherein the spacing of said first and second lugs about said axis is selected to initiate cutting of said second lug before cutting of said first lug is completed.

15. A seat belt webbing retractor comprising:

a spool member on which seat belt webbing is wound, said spool member being supported for rotation in a belt retraction direction and an opposite belt withdrawal direction;

a plastically deformable torsion bar member having a first portion and a second portion, said second portion of said torsion bar member being rotatable relative to said first portion, said torsion bar member twisting upon rotation of said second portion relative to said first portion;

an actuatable spool locking mechanism for when actuated blocking rotation of said spool member in the belt withdrawal direction, said spool locking mechanism including a ratchet member and a pawl movable into locking engagement with said ratchet member to block rotation of said ratchet;

one of said spool member and said torsion bar member and said ratchet member having a cutter portion;

said spool member being fixed for rotation with said first portion of said torsion bar member and said ratchet member being fixed for rotation with said second portion of said torsion bar member, said torsion bar member thereby resisting rotation of said spool member relative to said ratchet member;

said torsion bar member twisting and said spool member rotating in the belt withdrawal direction relative to said ratchet member and said cutter portion of said one of said members cutting into another one of said members to increase the resistance to rotation of said spool member relative to said ratchet member when said spool locking mechanism is actuated and upon the application of tensile force from the seat belt webbing to said spool member in an amount exceeding a predetermined amount;

wherein said ratchet member has said cutter portion and said cutter portion cuts into said spool member;

wherein said cutter portion of said ratchet member comprises at least one cutting tooth that is engageable with said spool member to cut into said spool member upon rotation of said spool member in the belt withdrawal direction relative to said ratchet member;

wherein said cutter portion of said ratchet member comprises at least first and second cutting teeth spaced apart from each other circumferentially about an axis of rotation of said spool member; and wherein the spacing of said first and second cutting teeth about said axis is selected to initiate cutting of said spool member by said second cutting tooth before cutting of said spool by said first cutting tooth is completed.

16. A seat belt webbing retractor comprising:

a spool member on which seat belt webbing is wound, said spool member being supported for rotation in a belt retraction direction and an opposite belt withdrawal direction;

a plastically deformable torsion bar member having a first portion and a second portion, said second portion of said torsion bar member being rotatable relative to said first portion, said torsion bar member twisting upon rotation of said second portion relative to said first portion;

an actuatable spool locking mechanism for when actuated blocking rotation of said spool member in the belt withdrawal direction, said spool locking mechanism including a ratchet member and a pawl movable into locking engagement with said ratchet member to block rotation of said ratchet;

one of said spool member and said torsion bar member and said ratchet member having a cutter portion;

said spool member being fixed for rotation with said first portion of said torsion bar member and said ratchet member being fixed for rotation with said second portion of said torsion bar member, said torsion bar member thereby resisting rotation of said spool member relative to said ratchet member;

said torsion bar member twisting and said spool member rotating in the belt withdrawal direction relative to said ratchet member and said cutter portion of said one of said members cutting into another one of said members to increase the resistance to rotation of said spool member relative to said ratchet member when said spool locking mechanism is actuated and upon the application of tensile force from the seat belt webbing to said spool member in an amount exceeding a predetermined amount;

wherein said spool member has said cutter portion and said cutter portion cuts into said torsion bar member; and wherein said torsion bar member is made from a softer material than said spool member and has a non-circular configuration that is stripped to a circular configuration by said cutter portion of said spool member when said spool locking mechanism is actuated and upon the application of tensile force from the seat belt webbing to said spool member in an amount exceeding the predetermined amount.

* * * * *